United States Patent [19]

Eikill et al.

[11] Patent Number: 5,206,941
[45] Date of Patent: Apr. 27, 1993

[54] FAST STORE-THROUGH CACHE MEMORY

[75] Inventors: Richard G. Eikill; Charles P. Geer; Sheldon B. Levenstein, all of Rochester, Minn.

[73] Assignee: International Business Machines Corporation, Armonk, N.Y.

[21] Appl. No.: 468,048

[22] Filed: Jan. 22, 1990

[51] Int. Cl.$^5$ .......................... G06F 9/00; G06F 13/00
[52] U.S. Cl. ................... 395/425; 364/964.2; 364/243.4
[58] Field of Search ............... 395/425; 364/DIG. 2, 364/DIG. 1

[56] References Cited

U.S. PATENT DOCUMENTS

| | | | |
|---|---|---|---|
| 3,771,137 | 11/1973 | Barner | 364/200 |
| 4,332,010 | 5/1982 | Messina | 364/200 |
| 4,439,829 | 3/1984 | Tsiang | 364/200 |
| 4,484,267 | 11/1984 | Fletcher | 364/200 |
| 4,654,819 | 3/1987 | Stiffler et al. | 364/900 |
| 4,695,951 | 9/1987 | Hooker et al. | 364/200 |
| 4,719,568 | 1/1988 | Carrubba | 364/200 |
| 4,819,154 | 4/1989 | Stiffler et al. | 364/200 |
| 4,831,622 | 5/1989 | Porter | 364/200 |

Primary Examiner—David Y. Eng
Attorney, Agent, or Firm—Frederick W. Niebuhr; J. Michael Anglin

[57] ABSTRACT

A fast store-through cache process is disclosed in connection with multiple processors sharing a main storage memory. Each processor has a cache memory including multiple cache lines, each line associated with an address in main storage. Each cache memory has a cache directory for recording main storage addresses mapped into cache memory, identifying cache lines as valid or invalid, and holding status bits of data words stored in the cache memory. According to the process, a data word is stored in the cache memory during a first clock cycle and the associated cache directory is read to determine whether the corresponding main storage address is mapped into the cache memory. If so, and if no status bits in the data word require update, the store to the cache memory is complete. If a different main storage address is mapped into the cache memory, processor logic generates a processor interrupt signal during the second clock cycle, and the processor is interrupted during the third clock cycle while the cache directory is modified to purge the corresponding cache line. If the main storage address is in the cache memory but the data includes at least one status bit requiring update, the interrupt signal is generated during the second clock cycle, with the cache directory modified to update status bits during the third clock cycle. Special logic forces modifications to the cache directory if two consecutive store or fetch operations correspond to the same location in main storage.

17 Claims, 4 Drawing Sheets

FAST STORE-THROUGH CACHE MEMORY

BACKGROUND OF THE INVENTION

The present invention relates to information processing systems including processing devices having cache memories and coupled to a shared main storage memory, and more particularly to a means for ensuring the integrity of data in the cache memories while increasing the speed of fetch and store accesses to the cache memories and main storage.

In information processing networks with multiple processing devices sharing a common main storage memory, cache memories can substantially enhance network performance. A plurality of cache memories can be provided, one within and uniquely associated with each of the processing devices and containing some of the information stored in the main memory. Whenever one of the processing devices performs data store or fetch operations in its associated cache memory rather than in the shared main memory, memory access time is substantially reduced. Generally there are two types of cache memories: store-through cache memory in which data is provided to the shared main memory each time it is stored in one of the cache memories; and store-in-buffer cache memory, in which the immediate store is just to the cache memory. The store-in-buffer cache memory handles all stores of its associated processing device, and thus requires fewer accesses to shared main memory, for a reduced main storage bandwidth. At the same time, store-in-buffer cache memories require more intercommunication circuitry among the cache memories and main storage, to ensure that main storage is kept current with the most recent update to any of the cache memories.

U.S. Pat. No. 4,484,267 (Fletcher) discloses an attempt to gain the advantages of both types of cache memory, namely a hybrid cache control selectively combining certain features found in store-in-buffer cache memories and store-through cache memories. The cache control utilizes a sharing flag associated with each line representation in each cache directory in a multiple processing device system. The flag uniquely indicates, for each line, whether the line is to be handled as a store-in-buffer line or a store-through line. The hybrid control reduces the required main storage bandwidth as compared to a similar network using store-through cache memories, since the control is only occasionally required to send stores to the main storage memory. On the other hand, as compared to a system employing store-in-buffer cache memories, the hybrid system improves performance.

Another approach to improving network performance is disclosed in U.S. Pat. No. 4,695,951 (Hooker et al), directed to a system of multiple processing devices, each having a store-into type cache memory. Data modified by a processor is stored in its associated cache memory. When another processor requires data from the same location, the data may be transferred directly from the original processor to the requesting processor, rather than to the requesting processor through main storage.

U.S. Pat. No. 4,439,829 (Tsiang) discloses a network in which a cache memory cycle is divided into two parts: a first part dedicated to processing device read requests, and a second part directed to all other operations, including fetching an address from a processor to check its associated cache memory, and writing to the cache memory. This division is said to eliminate certain contentions and the need to resolve them, and thus improve processing speed.

Any cache memory includes a table of main storage memory locations or addresses. Such table specifies not only the main storage locations which have been mapped into the cache memory, but also whether each particular location is valid or invalid. This table, herein referred to as a cache directory, further may hold certain status bits associated with the cache memory locations and their associated main storage memory locations.

For example, in certain information processing systems it is desired to identify some of the data words as "pointers" which contain, along with other data bits, an address identifying a particular byte or number of bytes within main storage memory. Pointers are distinguished from other data words by hardware tag bits which, when set, identify their associated data word as a pointer. Tag bits can be set only by tag instructions, with all other instructions resetting the tag bits. Accordingly, if a pointer is inadvertently modified by a data handling instruction rather than a tag instruction, the reset tag bits identify the pointer as no longer valid.

To enhance system performance, it is advantageous to store pointers and other data words mixed, i.e. without the need to reserve particular areas in main storage for exclusive use of pointers. Further, however, an information processing network might include devices utilizing formats which do not allow tag bits within data words. This creates the need to modify the tag bits in data words transmitted between main storage memory and such devices. To this end, when data words are moved from main storage memory to the devices, the tag bits are extracted, i.e. accumulated and saved in a separate field, e.g. in the cache directory of a processing device. In this type of network, the cache directory not only specifies the main storage locations mapped into the cache memory and their validity, but also holds status bits associated with such locations, for identifying the data at the location as an address pointer or in some other manner signifying the status of the data.

In connection with store-through cache memories, data storage operations are performed in two steps or clock cycles. During the first cycle, the cache directory is read to determine whether: (1) the target (requested) main storage memory location is currently mapped into the cache memory; (2) the target main memory location is currently mapped, and the status bits require update; or (3) the target main memory location is not currently mapped into the cache memory. An action during the second cycle is based on the results of the read. If the target main storage memory location was previously mapped into the cache memory, the store is completed and, if necessary, status bits are updated. If the target main storage memory location was not mapped into the cache memory, either the cache memory is bypassed and the data stored only in the main storage memory, or a line equivalent to the main storage location is fetched for the cache memory before the store operation is completed. In any event, each data storage operation requires at least two clock cycles.

Ideally, a cache memory would allow a data access (i.e. a store or fetch operation) every clock cycle, which of course would double the speed of such operations, given the same clock cycle. The "overhead" involved in providing separate cycles for checking the cache directory and for the actual store has been considered necessary to ensure the integrity of data stored in the cache memory.

Therefore, it is an object of the present invention to provide a data processing network including at least one processing device having a store-through cache memory, in which the speed of store and fetch operations is substantially increased at no loss of data integrity.

Another object of the invention is to provide a system in which a store of data to a store-through cache memory, and a compare or read of the cache directory, occur during the same clock cycle.

A further object is to provide a system of multiple processing devices sharing a main storage memory, with each of the processing devices including a store-through cache memory, with virtually no overhead associated with reading the cache directories.

Yet another object is to provide a process for storing to a store-through cache memory and to main storage once each clock cycle unless a different main storage location is resident and marked valid in the cache memory, and further for interrupting the associated processing device to identify a cache line as invalid in the event that a different main storage location is resident in the cache memory.

SUMMARY OF THE INVENTION

To achieve these and other objects, there is provided a process performed in connection with an information processing network including a processing device configuration for manipulating bit-encoded data as data words, each data word having a plurality of data bits. The network includes a main storage memory having memory locations for storing bit-encoded data, and a main storage interface connected to the processing configuration and to the main memory. The processing configuration further includes at least one designated processor having a store-through cache memory and a cache memory interface. The cache memory includes a plurality of cache locations for storing data and a cache directory for storing status information relating to the cache locations. The designated processor includes means for storing bit-encoded data to selected memory locations in the main storage memory via the main storage interface and means for storing bit-encoded data to selected cache locations in the cache memory via the cache memory interface.

The process includes the following steps:
  simultaneously storing a first data word to a first cache location in the cache memory, and reading the cache directory to determine the presence or absence of a need to modify the cache directory in view of the storage of the first data word;
  storing the first data word to a first memory location in the main storage memory;
  responsive to determining a need to modify the cache directory, generating a first interrupt signal for interrupting the designated processor for a predetermined length of time, to free the cache memory interface for the predetermined time; and
  modifying the cache memory directory during the predetermined time.

Preferably, the processing configuration is governed by a clock oscillator operating according to a series of constant length clock cycles, in which event the predetermined time is one such clock cycle.

The process may be utilized in connection with data words containing status bits, for example to identify particular data words as address pointers. Then, the step of determining the need to modify the cache directory includes the substeps of determining whether the first cache location corresponds to the first memory location; and, if so, determining whether a status bit in the first data word needs to be updated. The step of modifying the cache directory includes updating the status bit responsive to determining that the status bit requires an update. Alternatively, the first cache location is purged (tagged as invalid) responsive to a determination that the first cache location does not correspond to the first memory location.

The process can include a further step of simultaneously storing a second data word to a second cache location in the cache memory, and reading the cache directory to determine the presence or absence of a need to modify the cache directory in view of storing the second data word; storing the second data word to a second memory location in the main storage memory; responsive to determining a need to update the cache directory, generating a second interrupt signal for interrupting the designated processor for one clock cycle to free the cache memory interface for one clock cycle; and modifying the cache directory during the one clock cycle. The step of generating the first interrupt signal (if needed) and the step of storing the second data word to the second cache memory location are performed during the clock cycle immediately after the clock cycle during which the first data word is stored to the first cache location.

When considering continuing the process for storage of subsequent data words, it is apparent that so long as each of the cache locations corresponds to a memory location and no status update is required, a storage operation can be completed each clock cycle. Accordingly, the storage operations are accomplished in about half the time required by the conventional approach involving separate clock cycles for reading the cache directory and for storage to the cache memory. Of course, occasionally the cache directory read indicates that a cache location did not correspond to a memory location in the main storage memory, i.e. the main storage location was not mapped into the cache memory. Further, in a system using status bits, the read of the cache directory may indicate that the main storage location has been mapped into the cache memory, but status bits require update. In either event, the processing device is interrupted for a single clock cycle, while the cache line at which the corresponding data was stored is either purged (designated invalid in the directory) or the appropriate status bits in the cache directory are updated. In practice, virtually all of the storage operations require no purge or update, leading to a substantial reduction in the time required for storing data to the cache memories.

In accordance with a further aspect of the present invention, means are provided for determining whether two consecutive accesses, either being a store or a fetch, are directed to the same location in the main storage memory. If the first of these operations is found to require modifying the cache directory (a purge or an update), special handling of the second operation is required, to avoid an error due to the access to data in the second operation before it has been appropriately modified in the first operation.

In accordance with the present invention, the potential error is avoided for consecutive stores by forcing a purge for the second store, i.e. identifying the associated cache line as not valid, regardless of whether the second store operation indicates the need to purge or merely update. Similarly, in the case of a fetch followed by a store, when data for the cache line is returned from the main storage memory it is not written into the cache memory. For a store followed by a fetch, a cache miss is forced for the fetch operation.

In accordance with the present invention, stores are "blind" in the sense that data is stored into the cache memory before it is known whether the requested main storage location is mapped into the cache memory. A cache store error, whether because a different main storage location is mapped in the cache or because the status bits in the data word require update, requires just one additional clock cycle to account for the error. Thus, store operations to a store-through cache memory occur at a substantially improved rate for more effective use of the cache memory interface.

IN THE DRAWINGS

For a further understanding of the above and other features and advantages, reference is made to the following detailed description and to the drawings, in which.

DETAILED DESCRIPTION OF THE PREFERRED EMBODIMENT

Figure 1:
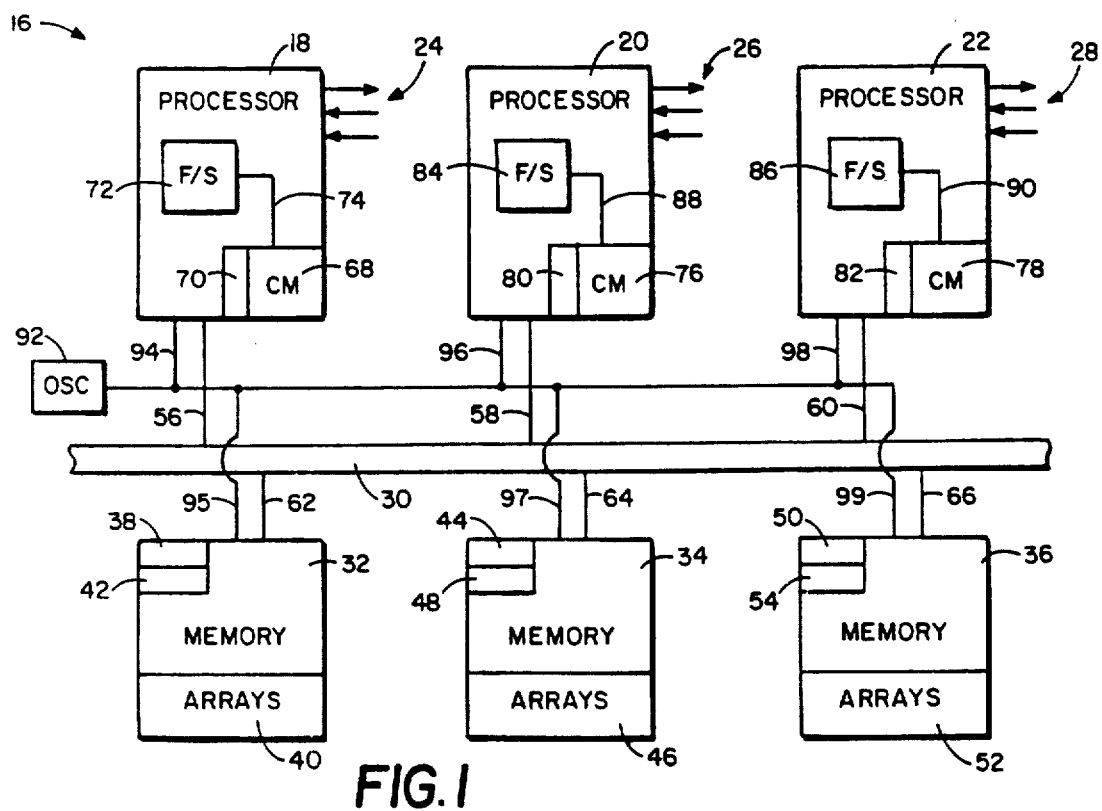
FIG. 1 is a schematic view of an information processing network with multiple processing devices, each having a cache memory, each device associated with a shared main storage memory.

Turning now to the drawings, there is shown in FIG. 1 an information processing network 16 for storing and performing selected operations upon bit-encoded data. The network includes three processing devices identified at 18, 20 and 22, each having circuitry for performing operations on data, and for providing commands and related data for transfer to and from a shared main storage memory. Arbitration links as indicated at 24, 26 and 28 join the three processing devices, and are used in combination with arbitration logic residing in the processing devices to assign priority to any one of the processors, in terms of access to an interface 30 between the processors and main storage. It is to be understood that the configuration of processing devices in this network could consist of a single processing device, or multiple processing devices in which multiple arbitration links are provided for a point-to-point connection of all processing devices.

The main storage memory includes multiple memory cards such as indicated at 32, 34 and 36. Memory card 32 includes a buffer 38, memory arrays 40 for storing bit-encoded data as data words, each word having a plurality of bits, and an internal register 42 connected to memory arrays 40. Data stored in the memory arrays is loaded into internal register 42 for temporary or intermediate storage, during which time tag bits (as discussed above) may be either extracted from or inserted into the data.

Memory cards 34 and 36 are similar to memory card 32, including respectively a buffer 44, memory arrays 46 and an internal register 48, and a buffer 50, memory arrays 52, and an internal register 54. These components are substantially identical to and function in the same manner as their counterparts in memory card 32. It is to be understood that the main storage memory can comprise multiple memory cards.

The interface associating the processors and memory cards includes a data bus and a command/address bus, each bus joined to all of the processing devices and memory cards. These busses transmit data in parallel. The data bus transmits what can conveniently be called working information, i.e. information of most direct interest to users of the network. The command/address bus transmits control information relating to commands to fetch, store or otherwise manipulate particular working data, and address information to identify the location of particular working data words in the memory arrays, or the location to which such data is to be sent.

Lines 56, 58 and 60 associate processors 18, 20 and 22 with interface 30 while lines 62, 64 and 66 similarly associate the interface and the memory cards. It is to be understood that in practice, separate lines are provided for transmitting working information and for transmitting command and address information. The interface further includes data paths not illustrated in FIG. 1 for controlling access to the data bus, and also may include a commonly shared communication bus for transmitting status information relating to working data. For a further explanation of this type of interface, reference is made to U.S. patent application Ser. No. 07/445,320, entitled "High Performance Shared Main Storage Interface", filed Dec. 4, 1989 and assigned to the assignee of the present application.

Processing device 18 includes a one-way associative store-through cache memory 68, which includes a plurality of cache lines, each associated with a particular set of addresses or locations in the main storage memory. Cache memory 68 further includes a cache directory 70. The cache directory is a record of the main storage memory addresses mapped into the cache memory, and stores an indication of whether each corresponding location in the cache memory is valid or invalid. Further, cache directory 70 contains status bits associated with each cache line and its associated address in the main storage memory. Such status bits include, for example, tag bits used to identify certain data words as address pointers, or to identify data as "valid" or "not valid". Another example is a sharing flag as taught in the aforementioned Fletcher patent.

As indicated at 72, processor 18 includes logic (in the form of semiconductor chip circuitry) for fetching and storing data and performing arithmatic logic operations upon bit-encoded data. A portion of logic 72 is dedicated to controlling stores to cache memory 68 and fetches or retrieval of data from the cache memory, via a cache interface 74. Logic 72 is capable of interrupting processor 18 to "steal" a clock cycle on interface 74, for modifying cache directory 70 in view of an earlier store or fetch operation, if necessary.

Processing devices 20 and 22 are similar to processing device 18, and include respective cache memories 76 and 78 with cache directories 80 and 82, logic 84 and 86, and respective cache interfaces 88 and 90. These components function in substantially the same manner as their counterparts in processing device 18.

Network 16 further includes a clock oscillator 92 connected to each of the processors as indicated at 94, 96 and 98, and to the memory cards as at 95, 97 and 99. Oscillator 92 generates a timing signal consisting of clock pulses at a predetermined cycle or frequency, and provides the timing signal to the processors and memory cards.

Figure 2:
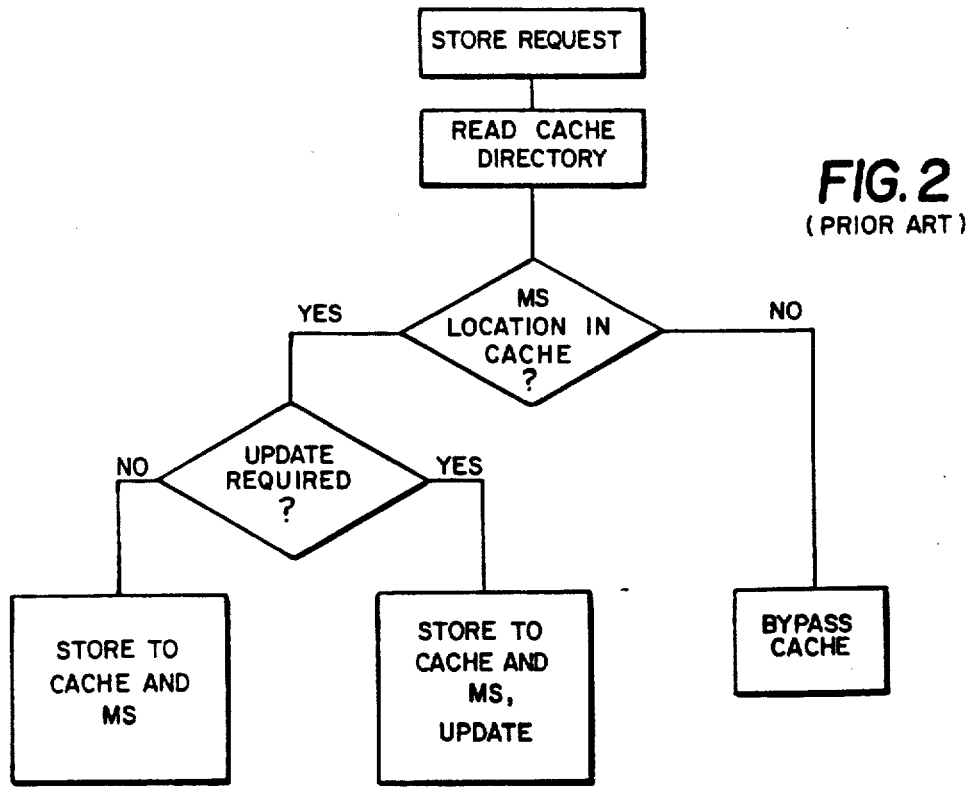
FIG. 2 is a flow chart of store operations to the main storage memory and to a cache memory according to a conventional approach.
Figure 3:
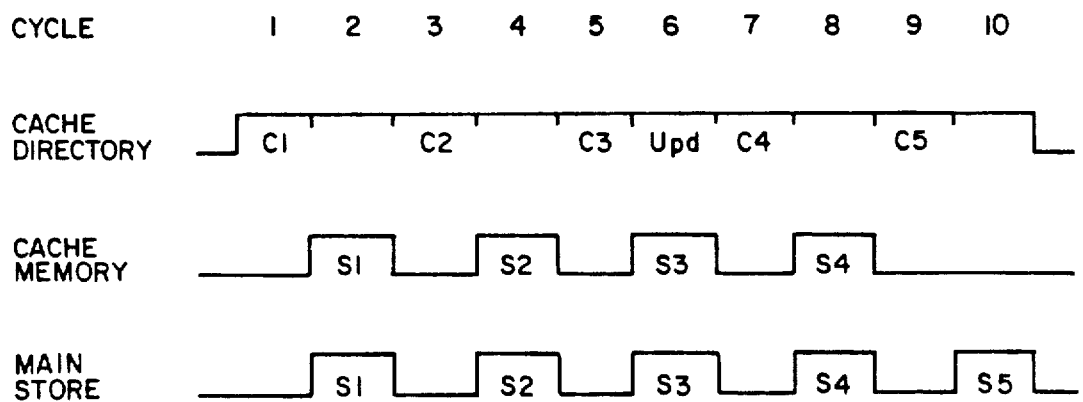
FIG. 3 is a timing diagram showing the conventional store operations.

The conventional approach to storing data to cache memories and to main storage memory can be considered in connection with FIGS. 2 and 3. Each store begins with a store request from one of the processors. The store request identifies a particular address or location in the main storage memory, to which data in the processor is to be sent. In response to the request and during a first clock cycle, the associated cache directory is read to determine if any of the lines in the cache memory corresponds to the requested address in main storage. If the requested main storage memory address has been mapped into the cache memory (i.e. a corresponding cache line is found), the cache directory further is read during the first clock cycle for an indication of a need to update any status bits in the data word to be stored.

The action taken during a second clock cycle (immediately following the first clock cycle) is based on the results of reading the cache directory. More particularly, if the main storage address is found mapped into the cache memory and no cache directory update is required, the data word is stored to the cache memory and to the main storage memory. If the need to update status bits is found, the data is again stored to the cache memory and to main storage, and the status bits in the cache directory are updated. Conversely, if a cache line corresponding to the requested main storage address is not found, the cache memory is bypassed and the data is stored only into the main storage memory. Alternatively, failure to locate a corresponding line in the cache memory leads to fetching a cache line for the requested main storage address, then completing the store to the cache memory and to main storage. In the majority of cases the cache memory is bypassed.

In either event, it is clear from FIG. 3 that each store operation requires two clock cycles. The odd numbered clock cycles are devoted to checking or reading the cache directory. Simultaneous stores to the cache memory and main storage memory occur during the even numbered cycles. The cache directory checks during clock cycles one and three indicated that the requested main storage address in each case was mapped into the cache memory, with no update of status bits required. The cache directory read in cycle five, however, indicated the need to update status bits, and the required update was performed during the sixth clock cycle. The cache directory check in cycle nine yielded no line in the cache memory corresponding to the requested main storage location. Accordingly, the cache memory was bypassed during the tenth clock cycle, and the data stored only to the main storage memory.

Figure 5:
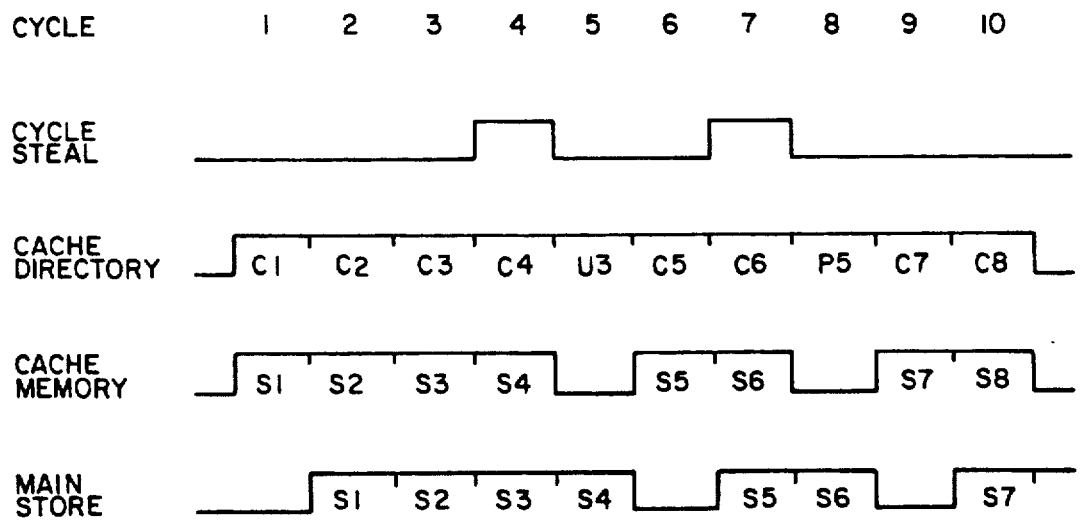
FIG. 5 is a timing diagram similar to that in FIG. 3 but showing stores in accordance with the present invention.
Figure 4:
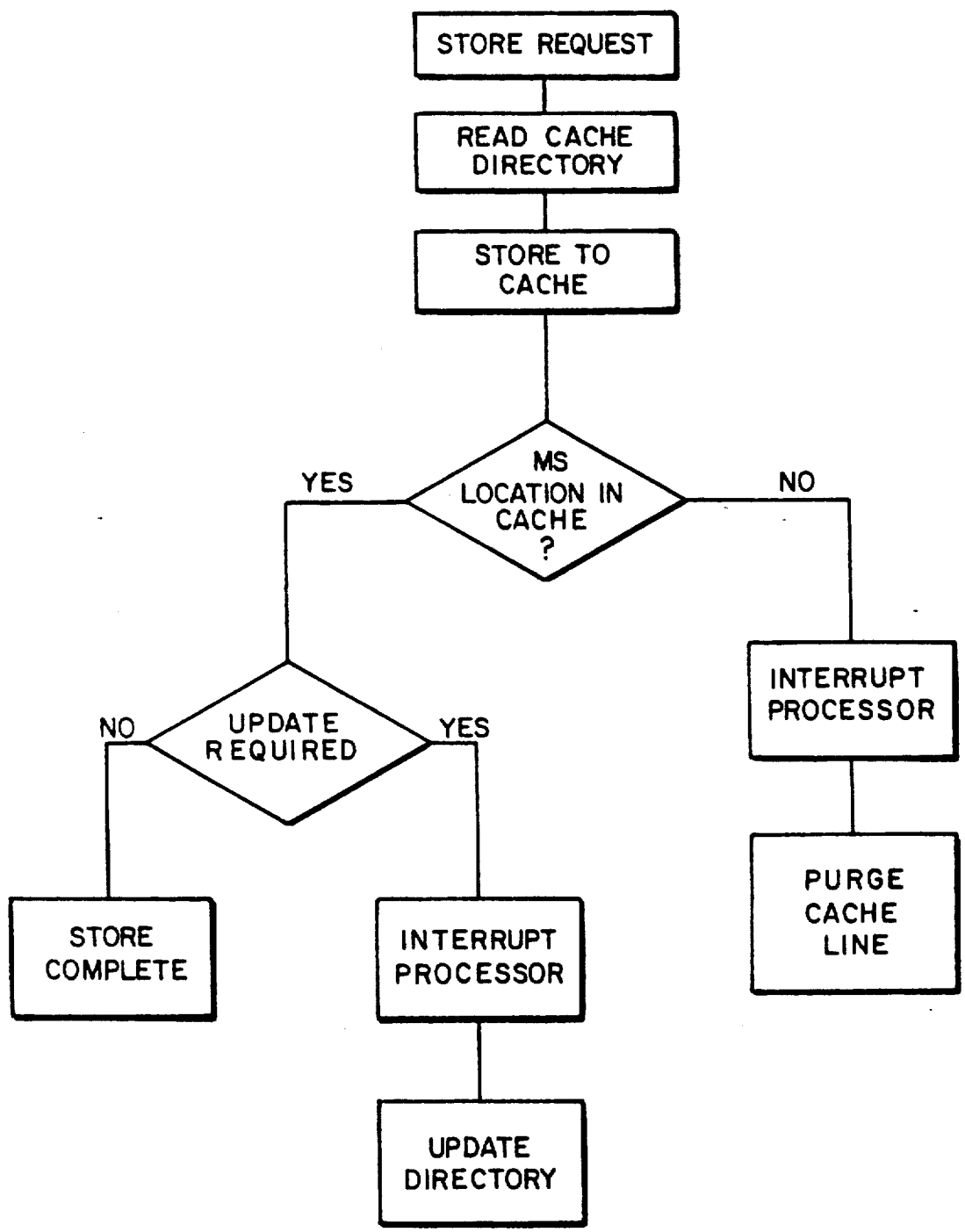
FIG. 4 is a flow chart of stores to main memory and to one of the cache memories in FIG. 1 in accordance with the present invention.

FIGS. 4 and 5 illustrate stores conducted in accordance with the present invention. As seen from FIG. 4, a store operation according to the present invention is initiated by a request from one of the processors, e.g. processor 18. During the first clock cycle, cache directory 70 of cache memory 68 is read, i.e. compared to the requested address in main storage, to determine whether the requested address has been mapped into the cache memory, and if so, whether any of the status bits in the data word require update. In contrast to the conventional approach, however, the data word is stored directly to cache memory 68 during the first clock cycle. This is known as a "blind" store to the cache memory, since it occurs without the benefit of knowing whether cache memory 68 contains a line corresponding to the requested main storage address. Nonetheless, the determinations made from reading cache directory 70 are the same, relating to the existence of a corresponding line in the cache memory and the need to update status bits.

In response to a determination that the requested main storage location was mapped into cache memory 68, and that no status bits required update, no further action is required since the storage to the cache memory is complete. The same data is of course stored to the main storage memory, but not until the second clock cycle. In response to the presence of a corresponding cache line and a need to update status bits, logic 72 generates a signal, during the second clock cycle, to interrupt processor 18 for a clock cycle. The processor is interrupted during the third clock cycle, during which the status bits are updated.

Responsive to an indication that a different main storage location has been mapped into cache memory 68, logic 72 generates a signal, again during the second clock cycle, to interrupt processor 18 for one clock cycle. Processor 18 is interrupted during the third clock cycle responsive to the interrupt signal, freeing cache interface 74 during this cycle for a purging of the cache line to which data was stored during the first clock cycle.

A sequence of store operations according to the present invention is illustrated in FIG. 5. During the first clock cycle, a first data word is stored to cache memory 68 while cache directory 70 is checked or read for the presence of a cache line corresponding to the requested main storage address. The first data word is stored to the main storage memory during the second clock cycle, while a second data word is stored to the cache memory as the cache directory is read relative to the second store. The results of the first and second cache directory reads were that the corresponding line in cache was present and no update was required.

By contrast, the third read of cache directory 70, corresponding to the storage into cache memory 68 of a third data word, indicates that the corresponding line is present but that updating of status bits is required. Consequently a cycle steal is raised during the fourth clock cycle. Responsive to the cycle steal, processor 18 is interrupted during the fifth clock cycle, during which the status bits in the cache directory associated with the third data word are updated.

During the sixth clock cycle a fifth data word is stored to the cache memory and the cache directory is read, indicating that the cache memory does not have a cache line corresponding to the requested location in main storage memory. This raises a cycle steal in the seventh clock cycle, causing an interruption in the processor during the eighth clock cycle, thus freeing cache interface 74 for a purging of the cache line in cache memory 68 at which the fifth data word had been stored. The storage of this data word to the main storage memory, during cycle seven, remains valid. As a result of the purge, cache directory 70 identifies the cache line holding the fifth data word as invalid, until a subsequent access to and update of the particular cache line.

Clock cycles nine and ten illustrate a final store to cache of a seventh data word and corresponding cache directory read, followed by storing the word to the main storage memory, as well as a store of an eighth data word to the cache memory and the associated check of the cache directory.

Thus, as compared to the conventional approach, storing data to the cache memory at the same time the cache directory is read substantially improved performance (eight stores to cache memory as opposed to five), in spite of the occasional need to interrupt the processor (steal a cycle) when an erroneous store to the cache is indicated. The degree of improvement varies, depending on the particular implementation. The improved performance stems from the fact that cache interface 74, and corresponding interfaces 88 and 90 in connection with their associated processing devices, can be used to access data every clock cycle, unless the cache control logic requires stealing a cycle to perform a directory modification, either to update status bits or to purge the associated cache line.

A further aspect of the present invention is directed to back-to-back accesses, i.e. consecutive store or fetch operations relating to the same address in the main storage memory. Back-to-back accesses raise a potential for erroneous results since the second access is reading the cache directory, while the cache control logic may be raising a cycle steal to update the cache directory based on the directory read associated with the first access. The directory read or compare associated with the second access receives "stale" data, possibly leading to an erroneous read.

The nature of the error varies with the operations involved. For example, if the back-to-back operations are both stores, there are four possible outcomes associated with store operations that also raise the need to modify the cache directory: a purge followed by a purge, a purge followed by a status bit update, a status bit update followed by a purge, and two consecutive status bit updates.

When a purge immediately follows a purge, the second purge does not need to be done. In this event, the cache control logic must force the cache directory to identify the associated cache line as invalid in connection with the second store, so the second purge will not occur.

When one status bit update follows a purge, the update would erroneously validate an invalid line. The cache control logic again must force the cache directory to identify the associated line as invalid in connection with the second store. Again, no update will occur.

When a status bit update is followed immediately by a purge, no risk of error is raised, since the associated cache line is left identified as invalid in the cache directory.

When a status bit update is followed immediately by another, the old (prior) status bit could be erroneously written back into the cache directory. To avoid this, the directory is forced to identify the associated cache line as invalid on the second store, which is equivalent to a purge during the second store.

One fetch followed by another does not raise a potential for error. However, when a fetch operation is followed by a store, and the fetch resulted in a cache memory miss (no line in the cache memory corresponding to the requested main storage location), the subsequent store accesses the same cache line. When data for the cache line returns from the main storage memory, it no longer is accurate since the subsequent store has modified the cache line. Accordingly, the cache control logic must force an update of the cache directory to identify the cache line as invalid.

When a store operation is followed by a fetch, the fetch may be to the same cache line but to a different address in the main storage memory (a cache synonym). If the store was a cache miss, which causes the line in the cache memory to be marked invalid, the subsequent fetch might receive a false hit, since it would occur before the directory is modified to mark the associated cache line invalid. In this event, the cache control logic must force a cache miss for the fetch operation.

Figure 6:
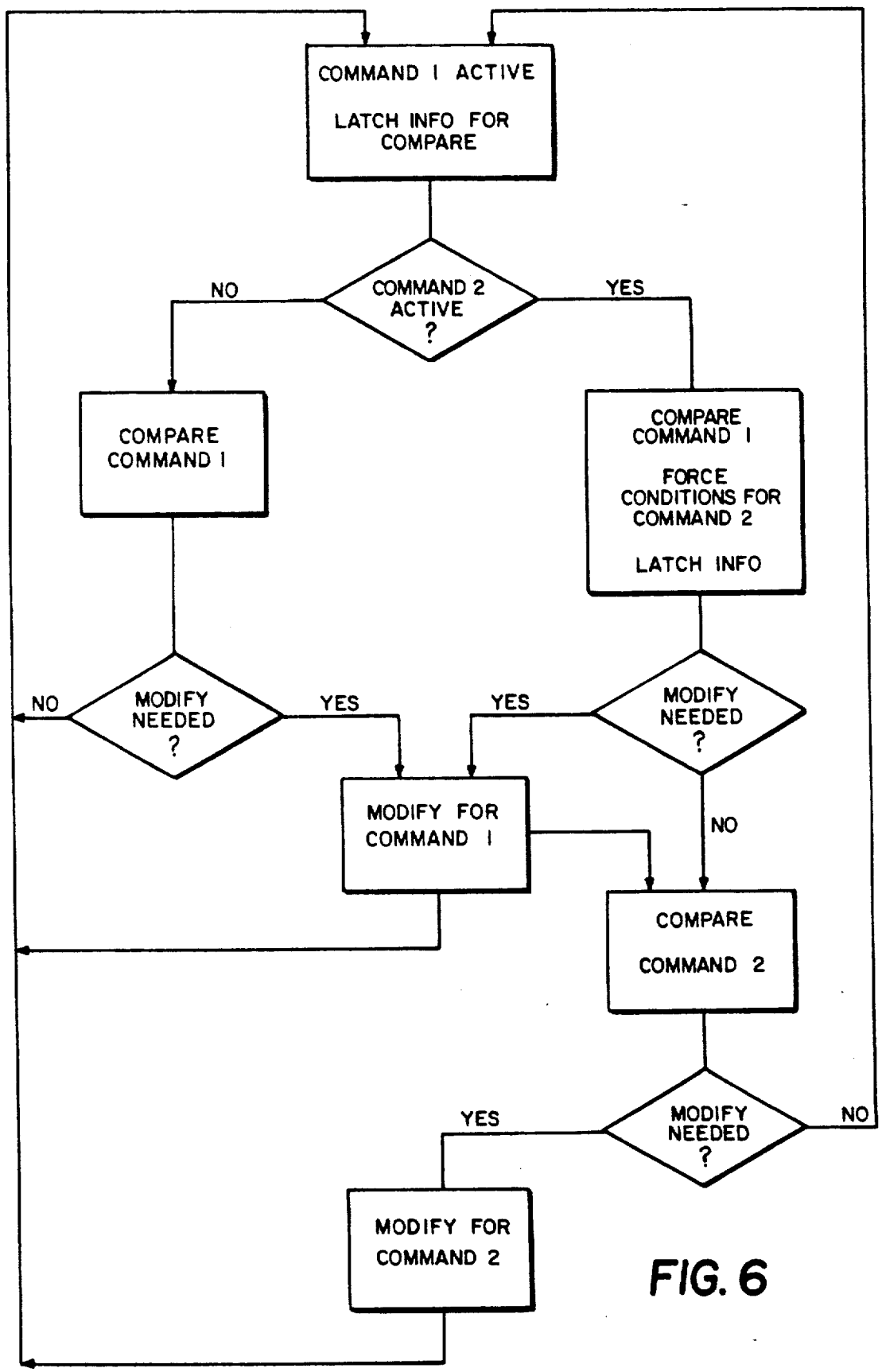
FIG. 6 is a flow chart of logic for handling consecutive store or fetch operations to the same main memory and cache memory location in accordance with the present invention.

The logic for preventing erroneous results due to back-to-back accesses is part of logic 72, 84 and 86 of the processors, and functions as illustrated in FIG. 6. The logic is initiated when a first command (identified as Command 1) is active, without regard to whether Command 1 is a store or a fetch command. In either event, information of Command 1, in particular the main storage address tag bits and a fetch or store indication, is latched for subsequent comparison with similar information of a second command identified as Command 2, and for cache hit/miss/update logic. This information is latched during the first of four clock cycles.

If Command 2 is not active during the second clock cycle, there is no indication of back-to-back operations, in which event the cache directory is read for an indication that no update is required, that an update is required, or that a purge is required, as explained above in connection with FIGS. 4 and 5. If no modification of the cache directory is required, the operation is complete. Conversely, if the read of the cache directory indicates the need to modify the directory, the modification (either a purge or an update) occurs during the third clock cycle.

If Command 2 is active during the second clock cycle, back-to-back accesses are indicated. The cache directory is read in connection with the first command as before. However, in addition a required condition is forced in connection with Command 2, such as the forced cache miss or forced identification of the cache line as invalid as discussed above. In other words, the forced condition overrides the modification (or absence of one) which would have occurred had Command 2 not immediately followed Command 1. Also occurring during the second clock cycle is the cache directory read associated with Command 2. Finally, the information associated with Command 2 is latched for comparison with the latched information associated with command 1 to confirm back-to-back operations, and for cache compare logic.

If a modification of the cache directory in view of Command 1 is indicated, the directory is modified during the third clock cycle. If the read during cycle two indicates the need for modifying the cache directory, or if a modification was forced during the second clock cycle, the modification occurs during the fourth clock cycle.

Thus in accordance with the present invention, the clock cycle for each store or fetch operation previously dedicated to reading the cache directory, is also used to store to a cache memory, for a substantial improvement in network performance. This approach requires added logic as discussed above, but enables use of the cache interface every clock cycle until the requested data is not resident in the cache memory. In response to this condition, the associated processors must wait for data to return from the main storage memory in the case of a fetch operation, or must wait for a single clock cycle while the cache directory is updated in the case of a store operation. However, the cost of this requirement is slight, compared to the performance gain due to completing a store or fetch in virtually every clock cycle. In view of the logic for handling back-to-back or consecutive operations, this approach substantially improves performance while maintaining the integrity of data in the cache memories.

What is claimed is:

1. In an information processing network including a processing configuration for manipulating bit-encoded data as data words, each word having a plurality of data bits, a main storage memory having memory locations for storing bit-encoded data, and a main storage interface connected to the processing configuration and to the main storage memory; said processing configuration including at least one processor having a cache memory and a cache memory interface, with said cache memory including a plurality of cache locations for storing data, and a cache directory for storing status information relating to the cache locations; said processor further including means for storing bit-encoded data to selected memory locations in the main storage memory via the main storage interface and means for storing bit-encoded data to selected cache locations in the cache memory via the cache memory interface: a process for storing data, including the steps of:

simultaneously storing a first data word to a first cache location in a first cache memory of a processing device, and reading a cache directory of the cache memory to determine the presence or absence of a need to modify the cache directory in view of storing the first data word;

storing the first data word to a first memory location in the main storage memory;

responsive to determining a need to modify the first cache directory, generating a first interrupt signal for interrupting the processing device for a predetermined length of time to free a cache interface associated with the first cache memory, for the predetermined time; and modifying the cache directory during the predetermined time.

2. The process of claim 1 wherein:
said processing configuration is governed by a clock oscillator operating according to a series of constant length clock cycles, and said predetermined amount of time is one clock cycle.

3. The process of claim 2 wherein:
each of said data words contains at least one status bit, and the step of determining the need to modify the cache directory includes the substeps of: determining whether the first cache location corresponds to the first memory location; and if so, determining whether a status bit in the first data word needs to be updated; and wherein the step of modifying the cache directory includes:
  (a) responsive to determining that the first cache location corresponds to the first memory location and that the status bit requires update, updating the status bit; and
  (b) alternatively, responsive to determining that the first cache location corresponds to a different memory location, purging the first cache location.

4. The process of claim 3 including the further steps of:

after the step of storing the first data word to the first cache location, simultaneously storing a second data word to a second cache location, and reading cache directory to determine the presence or absence of a need to modify the cache directory in view of storing the second data word;

storing the second data word to a second memory location in the main storage memory;

responsive to determining a need to modify the cache directory, generating a second interrupt signal for interrupting the processing device for one clock cycle to free the cache interface for one clock cycle; and modifying the cache directory during the clock cycle.

5. The process of claim 4 wherein:
the step of generating the first interrupt signal, and the step of storing the second data word to the second cache location, are performed during the next subsequent clock cycle after the storage of the first data word to the first cache location.

6. The process of claim 5 including the further steps of:

comparing the first and second cache locations to determine whether they correspond to the same main storage address;

responsive to determining that the first and second cache locations correspond to the same main storage address, and the need to modify the cache directory in view of storing the first data word, determining whether the modification is a purge or an update; and responsive to a determination that the modification is a purge, designating the second cache location as invalid in view of storing the second data word; and, alternatively, responsive to determining that the modification in view of storing the first data word is an update, determining whether the modification in view of storing the second data word is an update or a purge; and responsive to determining that the modification in view of storing the second data word is an update, forcing a purge on the second cache location.

7. The process of claim 6 wherein:
said processing device further includes means for accessing data at the memory locations in the main storage memory and at the cache locations for fetch commands, and said step of comparing the first and second cache locations includes the step of determining whether each of said first and second accesses is a store command or a fetch command; and responsive to determining that the first access is a fetch command and the second access is a store command, marking the cache directory invalid in connection with the second cache location to purge the second cache location; and, alternatively responsive to determining that the first access is a store command and the second access is a fetch command, forcing a cache miss for the fetch command.

8. In a system for processing and storing bit-encoded data including data words, each data word having a plurality of data bits, the system including a processing device for manipulating bit-encoded data, a main storage memory having arrays for storing bit-encoded data as data words, a main storage interface connected to the processing device and to the main storage memory for transmitting bit-encoded data between the processing device and the main storage memory;

said processing device having an associated store-through cache memory and associated processor logic for gaining access to cache locations within the cache memory and for accessing memory locations in the main storage memory to store and retrieve bit-encoded data; the cache memory including a plurality of cache locations each corresponding to a memory location in the main storage memory, and a cache directory for indicating the memory locations resident as corresponding cache locations in the cache memory and for alternatively indicating a valid condition or an invalid condition of each cache location; and a timing means for generating a timing signal including timing pulses at a constant frequency, and for providing the timing signal to said processing device; a process for storing data including the steps of:

during a first clock cycle, storing a first data word to a first cache location in the cache memory, and reading a cache directory of the cache memory to determine the presence or absence of a need to modify the cache directory in view of storing the first data word;

storing the first data word to a first memory location in the main storage memory;

during a second clock cycle immediately following the first clock cycle, and responsive to determining the need to modify the cache directory, generating a first interrupt signal for interrupting the processing device associated with the cache memory during a third clock cycle to free the associated cache memory interface during the third clock cycle; and modifying the cache directory during the third clock cycle.

9. The process of claim 8 wherein:

said step of storing the first data word to the first memory location occurs during the second clock cycle.

10. The process of claim 8 including the further steps of:

during the second clock cycle, storing a second data word to a second cache location and reading the cache directory to determine the presence or absence of a need to modify the cache directory in view of storing the second data word;

storing the second data word to a second memory location in the main storage memory;

responsive to determining the need to modify the cache directory, during the third clock cycle, generating a second interrupt signal for interrupting the processing device during a fourth clock cycle to free the cache memory interface during the fourth clock cycle; and modifying the cache directory during the fourth clock cycle.

11. The process of claim 10 wherein:

the first data word is stored to the main storage memory during the second clock cycle, and the second data word is store to the main storage memory during the third clock cycle.

12. The process of claim 10 including the further steps of:

comparing the first cache location and the second cache location to determine whether they correspond to the same memory location in the main storage memory;

responsive to determining that the first and second cache locations correspond to the same main storage location, and to determining the presence of the need to modify the cache directory in view of storing the first data word, determining whether the modification is a purge or an update; and responsive to a determination that the modification in view of storing the first data word is a purge, designating the second cache location as invalid in view of storing the second data word; and, alternatively, responsive to determining that the modification in view of storing the first data word is an update, determining whether the modification in view of storing the second data word is an update or purge; and responsive to determining that the modification in view of storing the second data word is an update, forcing a purge on the associated cache location.

13. The process of claim 12 wherein:

each of the processors further includes means for accessing data at the memory locations in the main storage memory and at the cache locations for fetch commands, and said step of comparing the first and second cache locations includes the step of determining whether the accesses associated with each of the first and second data words is a store access or a fetch access; and responsive to determining that the first access is a fetch and the second access is a store, marking the cache directory invalid in connection with the second cache location to purge the second cache location; and alternatively, responsive to determining that the first access is a store and that the second access is a fetch, forcing a cache miss for the fetch.

14. The process of claim 8 wherein:

the step of reading a cache memory to determine the presence or absence of a need to modify the cache directory includes determining whether the first cache location corresponds to the first memory location; and wherein the step of modifying the cache directory includes purging the first cache location responsive to determining that the first cache location does not correspond to the first memory location.

15. The process of claim 12 wherein:

each of said data words contains at least one status bit;

the step of determining the need to modify the cache directory further includes, responsive to determining that the first cache location corresponds to the first memory location, further determining whether a status bit of the first data word needs to be updated; and wherein the step of modifying the cache directory includes, responsive to determining that the first cache location corresponds to the first memory location and that a status bit of the first data word requires update, updating the status bit.

16. A network for processing bit-encoded data, including:

at least one processing device for manipulating bit-encoded data as data words, each data word having a plurality of data bits; a main storage memory having a plurality of memory locations for storing bit-encoded data as data words, and a main storage interface connected to the processing device and to the main storage memory for transmitting bit-encoded data between the processing device and the main storage memory;

wherein said processing device includes a store-through cache memory having a plurality of cache locations, each cache location corresponding to one of the memory locations in the main storage memory, and a cache interface associated with the cache memory, said cache memory further including a cache directory for identifying the memory locations resident as corresponding cache locations in the cache memory, and for indicating alternative valid and invalid conditions for each of the cache locations;

a timing means for generating a timing signal including timing pulses at a constant frequency to provide clock cycles of uniform duration, the timing means being operably connected to the processor and providing the timing signal to the processing device; and logic circuitry operably associated with said processing device, including circuitry for storing a first data word to a first cache location via the cache interface and circuitry for reading the cache directory for a need to modify the cache directory in view of storing the first data word during a first cycle of three consecutive ones of said clock cycles; circuitry responsive to determining the need to modify the cache directory in view of storing the first data word, for generating a first interrupt signal for interrupting the processing device to free the cache memory interface and circuitry for storing the first data word to a first memory location in the main storage memory, during a second consecutive clock cycle; and circuitry for interrupting the processing device and modifying the cache directory in view of storing the first data word, during a third consecutive clock cycle.

17. The network of claim 16 wherein:

said logic circuitry resides in the processing device.

* * * * *